(12) United States Patent
Yamazaki et al.

(10) Patent No.: US 7,542,551 B2
(45) Date of Patent: Jun. 2, 2009

(54) CORDLESS TELEPHONE HANDSET

(75) Inventors: Kenji Yamazaki, Tokyo (JP); Yoshihisa Takebe, Tokyo (JP)

(73) Assignee: Uniden Corporation, Tokyo (JP)

( * ) Notice: Subject to any disclaimer, the term of this patent is extended or adjusted under 35 U.S.C. 154(b) by 964 days.

(21) Appl. No.: 11/034,329

(22) Filed: Jan. 12, 2005

(65) Prior Publication Data
US 2006/0153343 A1    Jul. 13, 2006

(51) Int. Cl.
*H04M 11/00* (2006.01)
*H03F 99/00* (2006.01)

(52) U.S. Cl. ............... 379/52; 379/90.01; 379/93.05

(58) Field of Classification Search ............ 379/52, 379/90.01, 93.05; 455/426.1, 403, 455, 557, 455/117; 381/23.1, 312, 322, 385
See application file for complete search history.

(56) References Cited

U.S. PATENT DOCUMENTS 6,122,500 A * 9/2000 Dent et al. ............... 455/414.1

FOREIGN PATENT DOCUMENTS

JP    2001-094647 A    6/2001

* cited by examiner

*Primary Examiner*—Melur Ramakrishnaiah
(74) *Attorney, Agent, or Firm*—Steven J. Hultquist; Intellectual Property/Technology Law

(57) ABSTRACT

A cordless telephone handset that does not affect the use of a magnetic pick-up type hearing aid. The cordless telephone handset includes a TDD processing section for controlling transmission and reception by means of TDD communications, and a suppressing device for suppressing variations in the magnetic field generated by the TDD processing section. By suppressing variations in the magnetic field generated by the TDD processing section, the problem of magnetic field variations being picked up by a magnetic pick-up type hearing aid and being output as noise, is overcome.

8 Claims, 3 Drawing Sheets

CORDLESS TELEPHONE HANDSET

BACKGROUND

Hearing aids that incorporate a built-in microphone for picking up sounds traveling through the air, an amplifier for amplifying the sounds thus picked up, and a transducer (miniature speaker) for retransmitting the amplified sound, are known. However, if a person with hearing difficulties uses a telephone while wearing a hearing aid of this type, then the internal microphone of the hearing aid amplifies not only the sound transmitted from the speaker of the telephone device, but also the ambient noise, and hence the telephone is not readily usable by a person with hearing difficulties.

In order to eliminate problems of this kind, a magnetic pick-up type hearing aid has been proposed wherein, rather than picking up the sound propagating through the air by means of an internal microphone in the hearing aid, the variations in the magnetic field generated by the voice coil incorporated inside the speaker of the telephone device are picked up by an internal magnetic coil of the hearing aid and are used to drive a transducer. A hearing aid of this kind has a built-in magnetic coil forming a magnetic coupling with the voice coil of the telephone, and as sound is radiated from the speaker, the variations in current induced in the magnetic coil are amplified and used to drive the transducer.

As a reference relating to a magnetic pick-up type hearing aid, Japanese Patent Laid-open No. 2001-094647 is known, for example.

However, when a cordless telephone is used by a person with hearing difficulties, while that person is wearing a magnetic pick-up type hearing aid, then the electromagnetic waves radiated by the cordless telephone handset, and in particular, the electromagnetic waves induced by current variations in the TDD (Time Division Duplex) processing section located in the RF circuit of a digital cordless telephone handset, are also picked up, and hence bothersome noise is output from the hearing aid, thus impeding hearing ability.

It would therefore be a significant advance in the art to provide a cordless telephone handset which does not affect the use of magnetic pick-up type hearing aids.

SUMMARY

The present invention generally relates to a cordless telephone handset that does not affect the use of magnetic pick-up type hearing aids.

In one aspect, the present invention relates to a cordless telephone handset for performing TDD communications, comprising: a TDD processing section for controlling transmission and reception by means of TDD communications; and a suppressing device for suppressing variation in the magnetic field generated by the TDD processing section. According to the present invention, since variations in the magnetic field generated by the TDD processing section can be suppressed, it is possible to eliminate the problem of magnetic field variations being picked up by a magnetic pick-up type hearing aid and being output as noise.

The suppressing device may be constructed and arranged in such a manner that it suppresses variation in the magnetic field generated by the TDD processing section, when operation in a noise reduction mode is designated for a magnetic pick-up type hearing aid.

Another aspect of the present invention relates to a cordless telephone handset for performing TDD communications, comprising: a TDD processing section for controlling transmission and reception by means of TDD communications; a power source for supplying current to the TDD processing section; a current supply path provided between the TDD processing section and the power source; and a smoothing circuit for making the current flowing in the current supply path approximately equal at a transmission timing and a reception timing in TDD communications. According to the present invention, since there is no change in the current during a TDD cycle, it is possible to eliminate the problem of magnetic field variations being picked up by a magnetic pick-up type hearing aid and being output as noise.

The smoothing circuit may be constructed and arranged in such a manner that it makes the current flowing in the current supply path approximately equal at the transmission timing and the reception timing, when operation in a noise reduction mode is designated for a magnetic pick-up type hearing aid. By means of this construction and arrangement, since current is consumed by the smoothing circuit when the noise reduction mode is selected, it is possible to restrict increase in the power consumed by the cordless telephone handset.

In a further aspect, the present invention relates to a cordless telephone handset for performing TDD communications, comprising: a TDD processing section for controlling transmission and reception by means of TDD communications; a power source for supplying current to the TDD processing section; a current supply path provided between the TDD processing section and the power source; and a power source control circuit for controlling the current flowing in the current supply path at a transmission timing in TDD communications, in such a manner that the difference between the current flowing in said current supply path at a transmission timing and the current flowing in said current supply path at a reception timing are reduced in said TDD communications. Variations in the magnetic field can be suppressed by maintaining the current supplied from the power source to the TDD processing section at an approximately uniform value.

The power source control circuit may be constructed and arranged in such a manner that the difference between the current flowing in said current supply path at a transmission timing and the current flowing in said current supply path at a reception timing are reduced in said TDD communications, when operation in a noise reduction mode is designated for a magnetic pick-up type hearing aid.

In yet another aspect, the present invention relates to a cordless telephone handset for performing TDD communications, comprising: a TDD processing section for controlling transmission and reception by means of TDD communications; a power source for supplying current to the TDD processing section; and a current supply path and a current return path provided between the TDD processing section and the power source; wherein the current supply path and the current return path are provided in such a manner that the magnetic fields generated by the currents flowing in the respective current paths cancel each other out. By means of this construction and arrangement, it is possible suppress variations in the magnetic field, by means of a simple composition.

Desirably, the current supply path and the current return path are formed approximately in parallel or in a mutually intertwined fashion.

In a still further aspect, the present invention relates to a cordless telephone handset for performing TDD communications, comprising: a TDD processing section for controlling transmission and reception by means of TDD communications; a power source for supplying current to the TDD processing section; a current supply path provided between the TDD processing section and the power source; and a magnetic shield plate for magnetically shielding at least one of the TDD processing section and the current path.

DETAILED DESCRIPTION OF THE INVENTION, AND PREFERRED EMBODIMENTS THEREOF

First Embodiment

Figure 1:
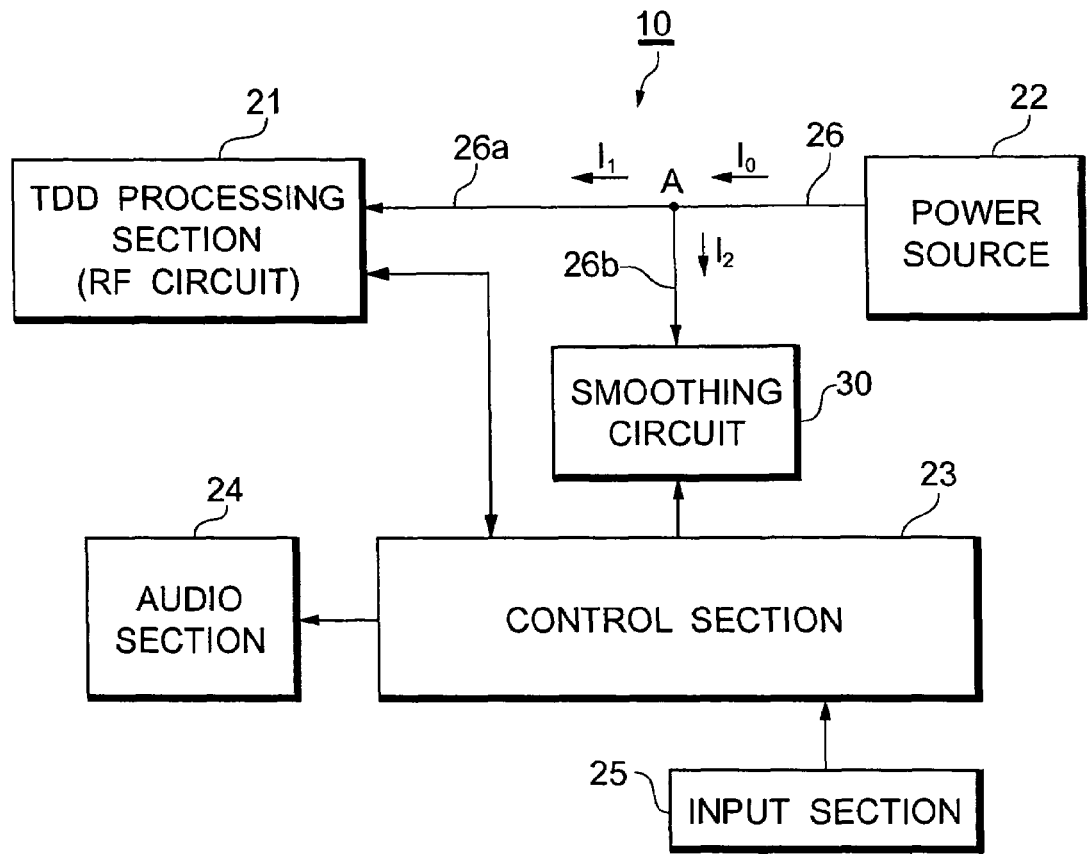
FIG. 1 is a functional block diagram of a cordless telephone handset according to a first embodiment.

FIG. 1 is a functional block diagram of a cordless telephone handset 10 according to a first embodiment. The cordless telephone handset 10 includes a TDD processing section 21, a power source 22, a control section 23, an audio section 24, an input section 25, a current supply path 26 and a smoothing circuit 30.

The TDD processing section 21 includes an RF circuit that controls transmission and reception of signals to and from a cordless telephone base unit by means of TDD (Time Division Duplex) communications. The power source 22 supplies a transmission current or a reception current to the TDD processing section 21 by means of the current supply path 26. Here, a transmission current is a current supplied from the power source 22 to the TDD processing section 21 when the cordless telephone handset 10 is at a transmission timing. Moreover, the reception current is a current supplied from the power source 22 to the TDD processing section 21 when the cordless telephone handset 10 is at a reception timing.

The control section 23 is a central control device for controlling the whole system, and it is constructed and arranged in such a manner that it can operate in an operating mode selected by the caller from a plurality of previously established operating modes. The caller is able to select the operating mode by operating an input section (key switches, or the like) 25. One of these operating modes is, for example, a noise reduction mode for magnetic pick-up type hearing aids. The control section 23 converts a reception signal supplied by the TDD processing section 21, from digital to analog, and drives the speakers of the audio section 24.

Figure 2A:
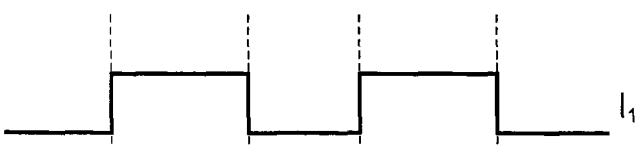
FIG. 2 is a waveform diagram of a transmission current and a reception current supplied to a TDD processing section.
Figure 2B:
Figure 2C:
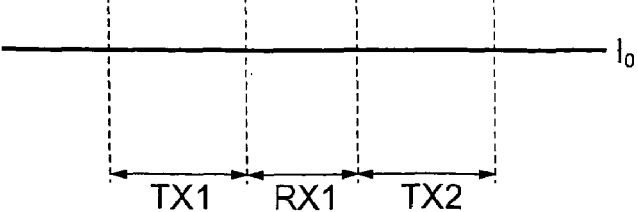

If a noise reduction mode has been selected, then the smoothing circuit 30 equalizes the current $I_0$ that flows along the current supply path 26. At branching point A, the current supply path 26 branches into a current supply path 26a for supplying current to the TDD processing section 21 and a branch path 26b for supplying current to the smoothing circuit 30. For the sake of this description, taking the current flowing along the current supply path 26a to be $I_1$ and the current flowing along the branch path 26b to be $I_2$, the relationship $I_0=I_1+I_2$ is established. FIG. 2A, FIG. 2B and FIG. 2C respectively show the current waveforms of the current $I_1$, current $I_2$, and current $I_0$. When the noise reduction mode is selected, the control section 23 activates the smoothing circuit 30, and at the reception timing (the reception slot) RX1 in TDD communications, the value of the current $I_2$ flowing into the branch path 26b is increased (see FIG. 2B). Consequently, the difference between the current flowing in the current supply path 26 at a transmission timings (transmission slots) TX1, TX2 and the current flowing in the current supply path 26 at a reception timing RX1 are reduced in said TDD communications, and hence the current $I_0$ is equalized (see FIG. 2A). In this way, since the current $I_0$ flowing the current supply path 26 is equalized by means of the noise reduction mode, then there is no variation in the current during the TDD cycle. Consequently, since variations in the magnetic field can be suppressed, it is possible to eliminate the problem of magnetic field variations being picked up by a magnetic pick-up type hearing aid and being output as noise. The smoothing circuit 30 functions as a control device for controlling variations in the magnetic field generated by the TDD processing section 21. In order to suppress magnetic field variations effectively, it is desirable that the branching point A on the current supply path 26 is positioned as closely as possible to the TDD processing section 21.

However, since a portion of the current $I_0$ flowing in the current supply path 26 is consumed continuously, the power consumption increases, which is undesirable. Therefore, the noise reduction mode should be switched to off in cases where it is not necessary to suppress variations in the magnetic field, for instance, in cases where the caller is not using a magnetic pick-up type hearing aid, or the like. If the noise reduction mode is switched off, then the current $I_2$ flowing along the branch path 26b becomes zero and hence $I_0=I_1$.

As an operational mode of the cordless telephone handset 10 in addition to the aforementioned noise reduction mode, it is also possible to include a HAC (Hearing Aid Compatible) mode compliant with FCC Part 68.316. The use of the HAC mode is not necessarily predicated on the use of a magnetic pick-up type hearing aid, but if the HAC mode is selected, then the cordless telephone handset 10 can be operated in the noise reduction mode automatically.

Second Embodiment

Figure 3:
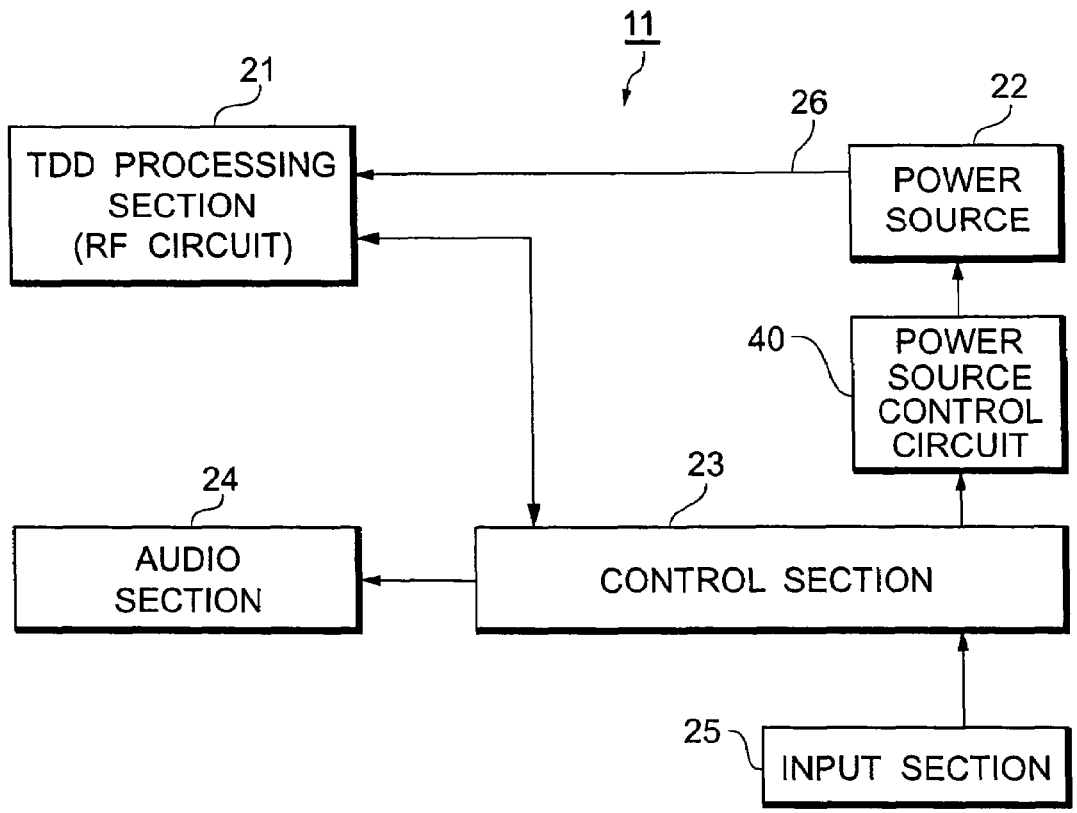
FIG. 3 is a functional block diagram of a cordless telephone handset according to a second embodiment.

FIG. 3 is a functional block diagram of a cordless telephone handset 11 according to a second embodiment. In the diagram, devices, or the like, labeled with the same reference numerals as in FIG. 1 indicate the same devices, or the like, and detailed description thereof is not included here.

The power source control circuit 40 is a circuit for controlling the current supplied from the power source 22 to the TDD processing section 21. If the noise reduction mode for a magnetic pick-up type hearing aid is selected, then the control section 23 controls the power source 22 and adjusts the transmission power level in such a manner that the transmission current and the reception current are substantially equal. Normally, the transmission current is greater than the reception current and therefore the transmission current is adjusted to a lower value. By this means, since the transmission current and the reception current flowing in the current supply path 26 are approximately equal, there is no change in the current during the TDD cycle. Consequently, variations in the magnetic field can be suppressed and it is therefore possible to reduce the effects on the magnetic pick-up type hearing aid. The power source control circuit 40 functions as a suppressing device, for suppressing variation in the magnetic field generated by the TDD processing section 21.

Third Embodiment

Figure 4:
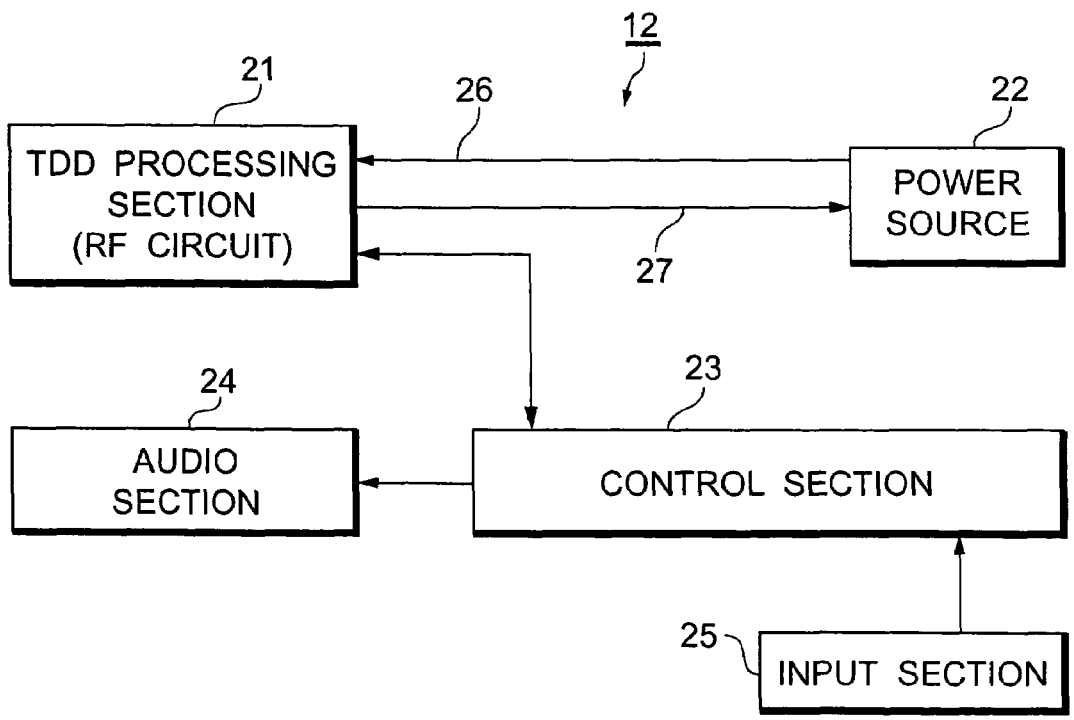
FIG. 4 is a functional block diagram of a cordless telephone handset according to a third embodiment.

FIG. 4 is a functional block diagram of a cordless telephone handset 12 according to a third embodiment. In the diagram, devices, or the like, labeled with the same reference numerals as FIG. 1 indicate the same devices, or the like, and detailed description thereof is not included here.

A current supply path 26 and a current return path 27 are provided between the TDD processing section 21 and the power source 22. The current supply path 26 and the current return path 27 are provided in such a manner that the magnetic fields generated by the currents flowing in the respective current paths cancel each other out. As a wiring method, it is possible to wire the current supply path 26 and the current return path 27 in an approximately parallel (approximately equidistant) fashion, or to wire them in such a manner that they are mutually intertwined. The currents flowing along the current supply path 26 and the current return path 27 are of the same magnitude but opposite in direction, and therefore by wiring the current paths in this fashion, it is possible to make the magnetic fields generated by the respective current paths cancel each other out.

According to the present embodiment, since variations in the magnetic field can be suppressed by wiring the power supply lines in a parallel or mutually intertwined fashion, it is possible to eliminate the problem of magnetic field variations being picked up by a magnetic pick-up type hearing aid and being output as noise. Furthermore, it is also possible to suppress magnetic field variations effectively by means of a simple construction and arrangement, without controlling the transmission current or reception current. Moreover, since the noise reduction mode is unnecessary, system control is simplified.

Fourth Embodiment

Figure 5:
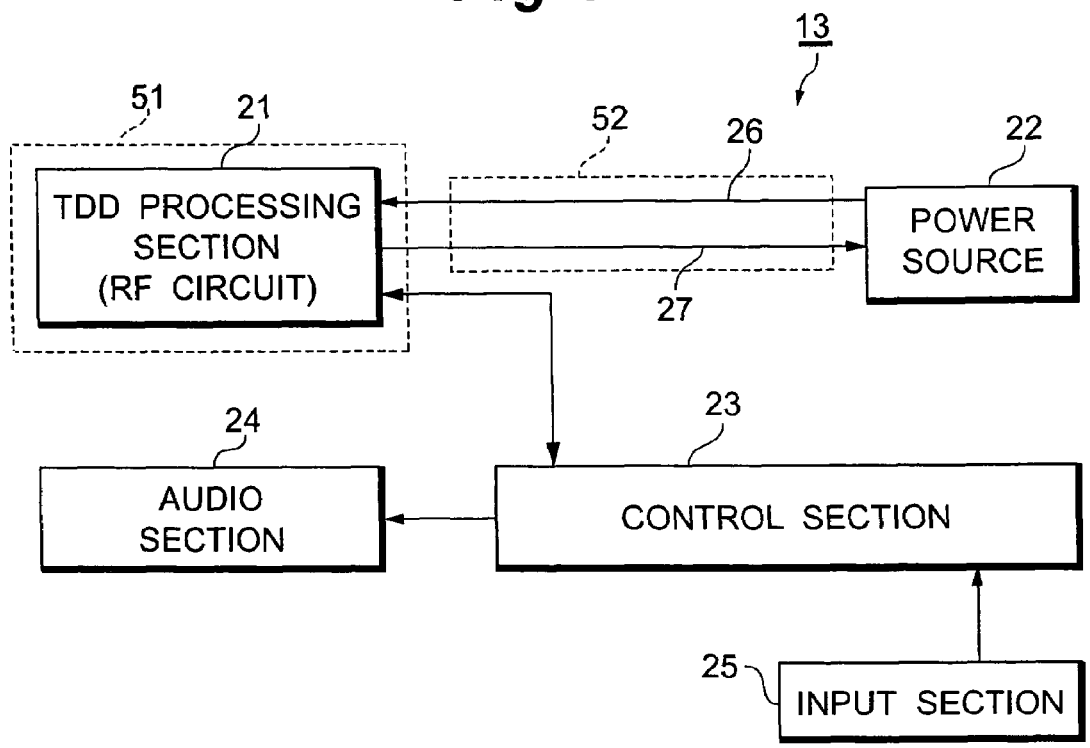
FIG. 5 is a functional block diagram of a cordless telephone handset according to a fourth embodiment.

FIG. 5 is a functional block diagram of a cordless telephone handset 13 according to a fourth embodiment. In the diagram, devices, or the like, labeled with the same reference numerals as FIG. 1 indicate the same devices, or the like, and detailed description thereof is not included here.

The TDD processing section 21 is magnetically shielded by a magnetic shield plate 51, and the power supply line (current supply path 26 and current return path 27) is magnetically shielded by a magnetic shield plate 52. A ferromagnetic material, or the like, is suitable for the magnetic shield plates 51 and 52.

By magnetically shielding the TDD processing section 21, which forms a source of magnetic energy, or the power supply line (current supply path 26 and current return path 27), it is possible to eliminate the problem of magnetic field variations being picked up by a magnetic pick-up type hearing aid and being output as noise.

It is also possible to adopt a construction and arrangement wherein only one of either the TDD processing section 21 or the power supply line (current supply path 26 and current return path 27) is magnetically shielded. Furthermore, it is also possible to adopt a construction and arrangement wherein, as well as magnetically shielding the power supply line (current supply path 26 and current return path 27) by means of a magnetic shield plate 52, the respective magnetic fields generated by the current paths are made to cancel each other out by positioning the current supply path 26 and the current return path 27 in an approximately parallel (approximately equidistant) fashion, or in a mutually intertwined fashion.

Fifth Embodiment

Figure 6:
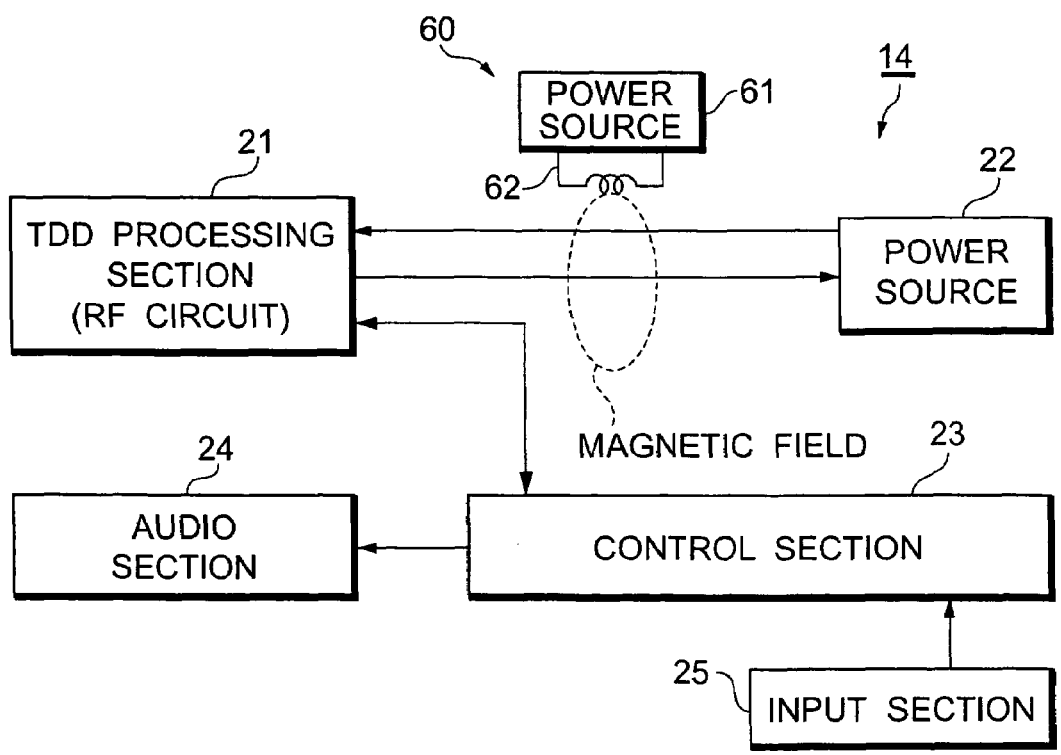
FIG. 6 is a functional block diagram of a cordless telephone handset according to a fifth embodiment.

FIG. 6 is a functional block diagram of a cordless telephone handset 14 according to a fifth embodiment. In the diagram, devices, or the like, labeled with the same reference numerals as FIG. 1 indicate the same devices, or the like, and detailed description thereof is not included here.

A magnetic field canceller 60 comprises a coil 61 forming magnetic field generating means and a power source 62 for supplying current to the coil 61. Magnetic field variations can be suppressed by using a magnetic field generated by the magnetic field canceller 60 to cancel out the magnetic field generated by the TDD processing section 21 or the power supply line (current supply path 26 and current return path 27). Consequently, it is possible to eliminate the problem of magnetic field variations being picked up by a magnetic field pick-up type hearing aid and being output as noise.

We claim:

1. A cordless telephone handset for performing TDD communications, comprising:
    a TDD processing section for controlling transmission and reception by means of said TDD communications; and
    a suppressing device for suppressing variation in the magnetic field generated by said TDD processing section,
    wherein said suppressing device suppresses variation in the magnetic field generated by said TDD processing section, when operation in a noise reduction mode is designated for a magnetic pick-up type hearing aid.

2. A cordless telephone handset for performing TDD communications, comprising:
    a TDD processing section for controlling transmission and reception by means of said TDD communications;
    a power source for supplying current to said TDD processing section;
    a current supply path provided between said TDD processing section and said power source; and
    a smoothing circuit for making the current flowing in said current supply path substantially equal at a transmission timing and a reception timing in said TDD communications.

3. The cordless telephone handset according to claim 2, wherein said smoothing circuit makes the current flowing in said current supply path substantially equal at said transmission timing and said reception timing, when it is designated to operate in a noise reduction mode for a magnetic pick-up type hearing aid.

4. A cordless telephone handset for performing TDD communications, comprising:
    a TDD processing section for controlling transmission and reception by means of said TDD communications;
    a power source for supplying current to said TDD processing section;
    a current supply path provided between said TDD processing section and said power source; and
    a power source control circuit for controlling the current flowing in said current supply path at a transmission timing in said TDD communications, in such a manner that the difference between the current flowing in said current supply path at a transmission timing and the current flowing in said current supply path at a reception timing are reduced in said TDD communications.

5. The cordless telephone handset according to claim 4, wherein said power source control circuit controls the current flowing in said current supply path at a transmission timing in said TDD communications in such a manner that the difference between the current flowing in said current supply path at a transmission timing and the current flowing in said current supply path at a reception timing are reduced in said TDD communications, when operation in a noise reduction mode is designated for a magnetic pick-up type hearing aid.

6. A cordless telephone handset for performing TDD communications, comprising:
- a TDD processing section for controlling transmission and reception by means of said TDD communications;
- a power source for supplying current to said TDD processing section; and
- a current supply path and a current return path provided between said TDD processing section and said power source;
- wherein said current supply path and said current return path are provided in such a manner that the magnetic fields generated by the currents flowing in the respective current paths cancel each other out.

7. The cordless telephone handset according to claim 6, wherein said current supply path and said current return path are provided substantially in parallel or in a mutually intertwined fashion.

8. A cordless telephone handset for performing TDD communications, comprising:
- a TDD processing section for controlling transmission and reception by means of said TDD communications;
- a power source for supplying current to said TDD processing section;
- a current supply path provided between said TDD processing section and said power source; and
- a magnetic shield plate for magnetically shielding at least one of said TDD processing section and said current path.

* * * * *